Figure 2:
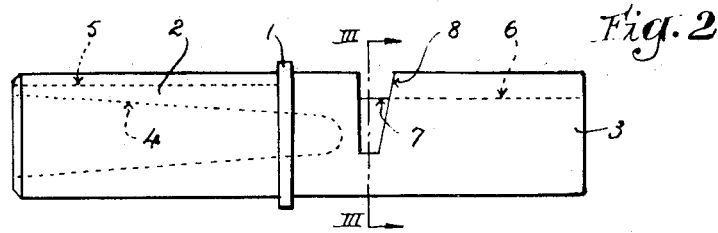

May 31, 1966  F. GARCIA  3,253,846

MEANS OF ASSEMBLING TUBULAR ELEMENTS

Filed July 10, 1964

INVENTOR.
FRANÇOIS GARCIA
BY
Nina M. S. Lawrence

United States Patent Office 3,253,846
Patented May 31, 1966

3,253,846
MEANS OF ASSEMBLING TUBULAR ELEMENTS
François Garcia, La Duchere-Chateau-Lyon, France, assignor to Ateliers Savigny, a corporation of France
Filed July 10, 1964, Ser. No. 381,706
3 Claims. (Cl. 287—127)

This invention relates, in general, to improvements made in the means utilized to insure the assembly of two tubular elements. It is particularly, but not exclusively, applicable to the assembly of light metal cylindrical tubes (e.g. aluminum alloys).

An example of the application of the invention is in the case of demountable tent poles for camping. Such poles are generally made by joining them to each other with a series of circular section tubes. One end of each tube is hammered out so as to constitute a kind of cylindrical tip appropriate for engagement by force in the opposite extremity of another tube. It may be noted that, when these tubes are made of light metal, the demounting of the elements which make up the pole is particularly delicate, the cylindrical tips of the tubular extremities being wedged inside the ones they engage. Obviously, these tips may be given an outside diameter slightly less than the inside diameter of the free extremities of the tubes so as to avoid any untimely wedging; but, then, the assembly is not rigid, the different elements of the pole being susceptible to play within each other both axially and laterally.

The present invention has for its purpose the removal of the aforementioned disadvantages.

It is the object of the present invention to provide a method of assembling tubular elements which can be easily accomplished and which makes possible the locking of the elements in the assembled position, thereby eliminating simultaneously all axial or lateral play.

The present invention comprises applying an assembly tip to one of the extremities of one of the two tubular elements to be assembled, the second tubular element being equipped on its inside wall with a projecting pin, and the assembly tip being adapted to be engaged in the free extremity of the second tubular element and having around its periphery some depressions in the form of steps, arranged in such a way that rotation of said elements with relation to one another causes displacement of the aforementioned pin both radially and axially.

In accordance with a preferred embodiment of the aforementioned arrangement, the assembly tip is made of one piece of cylindrical section and of a plastic material of low friction coefficient, e.g., polyamide or superpolyamide. This tip has a projecting annular collar which contains a rear part intended to be fitted by force into the extremity of one of the tubular elements and remain fixed therein, and a forward part suitable for engagement in the free extremity of the second element. This forward part contains a longitudinal groove for the passage of the pin provided in the free extremity of the second element, which groove or depression leads into a transverse depression whose bottom, of excentric semi-cylindrical section with respect to the tip, forms a ramp for the radial displacement of said pin, while the respective forward faces on each side of the outlet of the aforementioned groove are made oblique in order to form ramps for the axial displacement of the pin.

Figure 1:
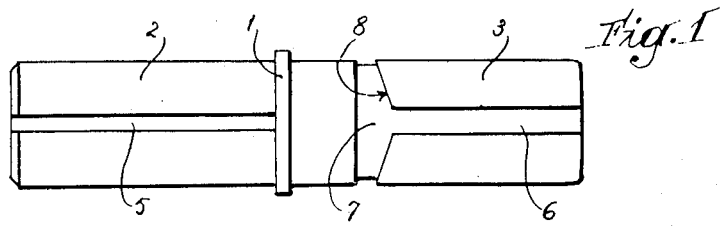
Figure 3:
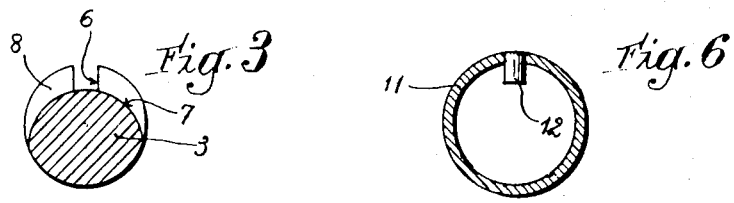
Figure 6:
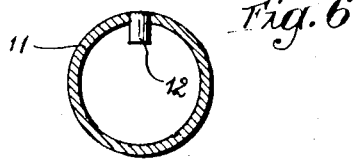
Figure 4:
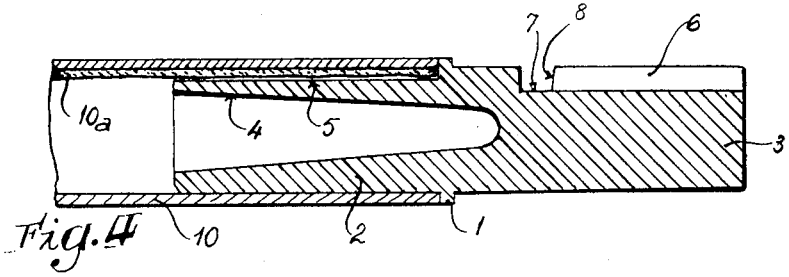
Figure 5:
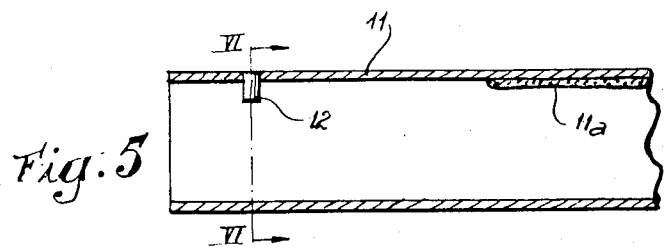

The attached drawing, given by way of example, will make it possible to understand the invention more clearly, as well as the characteristics it offers and the advantages it is able to provide:

FIGURE 1 is a top view of an assembly tip for use in the present invention;
FIGURE 2 is a side view of same;
FIGURE 3 is a cross section according to III—III of FIGURE 2;
FIGURE 4 is a longitudinal section showing the tip fitted into the extremity of one of the two tubular elements to be assembled;
FIGURE 5 is an axial section of the extremity of the second tubular element; and
FIGURE 6 is a cross section according to VI—VI of FIGURE 5.

The assembly tip represented in FIGURES 1 to 4 is made of a cylindrical piece of plastic material of the polyamide or superpolyamide type. This piece has on its periphery an annular collar 1 which projects and determines the two parts 2 and 3. Part 2, which will be called hereinafter the "read part," contains a hollow release device 4, oriented axially with respect to the body of the tip. There is also provided on this rear part 2 a narrow throat 5 arranged according to one of the generatrices of the cylindrical wall of the tip.

Part 3, or the "forward part," has a longitudinal groove 6 which terminates at one end at the free extremity of the tip, and at the other end in a transverse depression equipped a certain distance in advance with an annular collar 1. As demonstrated in FIGURE 3, the bottom 7 of this transverse depression shows a semi-cylindrical section out of axis with respect to the periphery of the tip, so as to form a ramp, as will be explained in detail below. Moreover, the two lateral faces 8, which constitute the forward transverse wall of the depression and which are arranged on either side of the outlet from longitudinal groove 6, are oriented obliquely toward the collar 1 so as to likewise form activating ramps; this obliquity of the faces 8 is particularly visible in FIGURE 1.

It is understood that the rear part 2 of the tip may be fitted by force inside of one (reference No. 10), of the two tubular elements to be assembled. As represented in FIGURE 4, in the event that this element 10 is constituted by a tube with welded rims, the longitudinal weld rim, diagrammed in 10a which projects over the inside wall of said element, finds its place in the throat 5 of the tip, thus opposing any untimely angular displacement of said tip with respect to the element of tube 10. The collar 1, moreover, forms a stop intended to limit the entry of the tip into element 10.

The second tubular element to be joined, which is assumed to be likewise made up of a tube 11 (FIGURE 5) provided with a welded rim 11a, has a radial pin 12 (FIGURE 6) which projects over the inside wall of said element. This pin 12 is preferably made in the form of a cylindrical dowel, riveted or otherwise attached to element 11, appropriately perforated for such purpose. It will also be noted that the inside rim 11a is cut off in the vicinity of the extremity of reference by tubular element 11, giving it a length at least equal to that of the forward part 3 of the above-described tip.

When it is desired to assemble the two elements 10 and 11, we start by presenting the element 11 in such a way that its pin 12 is in alignment with respect to the longitudinal groove 6 of the tip and said element is then engaged in the tip. The pin 12 is thus brought up to the rear outlet of groove 6, i.e., up to the transverse depression 7–8. It is then sufficient to turn one of the elements in either direction with respect to the other one in order to ensure the locking of same in the assembled position. It is to be understood that, as a result of this relative rotation, the section presented by the bottom of ramp 7 tends to push pin 12 radially, thus eliminating all lateral play between the tip and the element 11. In the same way, the clockwise or counterclockwise rotation of pin 12 with respect to the lateral faces 8 (or vice-versa), because of the obliquity of said faces, causes the displacement of the pin in the longitudinal direction, up to the point that the terminal edge of the element 11 comes to strike against the collar 1; thus all axial play is eliminated. The locking in position of pin 12 is ensured by the elasticity of the plastic material of which the tip is made, said pin becoming anchored in some manner in the lateral oblique faces 8 and in the bottom 7.

In order to disconnect the two elements 10 and 11, the operation is reversed, that is, one turns to the right or left one of the elements with respect to the other and slides them axially to disengage the forward part 3 from the tip. In both cases, the operation is easy due to the fact that the plastic material of the tip facilitates the sliding of the metal, and also that the forward part 3 of this tip can readily have a diameter smaller than the inside diameter of element 11, because the locking action eliminates all play relatively between the two parts. The rigid holding of the rear part 2 of the tip inside of element 10 can be reinforced, if desired, either by gluing or by adapting to the periphery of this part 2 some ribs or projecting rims assuring the self wedging of said part in case there is a force tending to displace the tip longitudinally.

It is understood, finally, that, in the event tubes 10 and 11 constitute the elements of a tent pole, the forward part 3 of the tip may be adapted for the passage and holding of the elastic band which customarily joins these elements together, a square bore terminating at one end in the bottom of groove 6 and at the other end on the terminal face of the forward portion 3 in question.

It is understood that the invention can be used for the purpose of assembling two tubular elements of different diameter or cross section, the rear part of the tip in such a case being appropriately shaped. It is also understood that the invention encompasses not only the tips forming the basis of the above assembly, but likewise the tubular elements adapted with such tips, as well as the units constructed by means of such elements.

Although the present invention has been described with a certain degree of particularity, it is understood that the present disclosure is only by way of example and that numerous changes in the details of construction and the combination and arrangement of parts may be resorted to without departing from the spirit and the scope of the invention as hereinafter claimed.

What is claimed is:

1. Means for assembling tubular elements, which comprises the combination of first and second tubular elements to be assembled and an assembly tip for joining said first and second tubular elements, said first tubular element having a longitudinal projecting rim on its inside wall, said second tubular element having a projecting pin on its inside wall, said assembly tip having a rear portion and a forward portion, a projecting annular collar separating its rear portion from its forward portion, a longitudinal channel extending backwards from said annular collar along the outside wall of said rear portion to the free end thereof, said longitudinal channel being adapted to receive the longitudinal projecting rim on the inside wall of said first tubular element, and said annular collar forming a stop when said rear portion is fixed in the extremity of said first tubular element, the forward portion of said assembly tip having a longitudinal groove on its outside surface extending backward from its free extremity and terminating in a transverse depression, said transverse depression extending on both sides of said longitudinal groove, said longitudinal groove being adapted to form a passageway for the projecting pin on said second tubular element when the assembly tip is inserted in said second tubular element, said transverse depression on said assembly tip having a bottom portion of eccentric semi-cylindrical section with respect to said assembly tip and forward faces oriented obliquely, said transverse depression being adapted to receive said projecting pin on either side of said longitudinal groove upon rotation of said assembly tip and said second tubular element with respect to each other, thereby causing displacement of said projecting pin radially and axially.

2. The means for assembling tubular elements claimed in claim 1, in which the assembly tip is made of plastic material.

3. The means for assembling tubular elements claimed in claim 1, in which the assembly tip is made of a plastic material selected from the group consisting of polyamide and superpolyamide.

References Cited by the Examiner

UNITED STATES PATENTS

| 363,122 | 5/1887 | Dimick. |
| 2,477,818 | 8/1949 | Murdock. |
| 2,871,034 | 1/1959 | Wiltse _____ 285—235 X |

EDWARD C. ALLEN, *Primary Examiner.*

A. V. KUNDRAT, *Assistant Examiner.*